(12) United States Patent
Palmer et al.

(10) Patent No.: US 10,183,538 B2
(45) Date of Patent: Jan. 22, 2019

(54) TOWING HITCH AND HITCH-MOUNTABLE ACCESSORY STORAGE AND LOCKING APPARATUS

(71) Applicants: Michael Gordon Palmer, Easton, PA (US); Todd Allen Palmer, Easton, PA (US); John Thomas Palmer, Easton, PA (US)

(72) Inventors: Michael Gordon Palmer, Easton, PA (US); Todd Allen Palmer, Easton, PA (US); John Thomas Palmer, Easton, PA (US)

( * ) Notice: Subject to any disclaimer, the term of this patent is extended or adjusted under 35 U.S.C. 154(b) by 6 days.

(21) Appl. No.: 15/350,007

(22) Filed: Nov. 11, 2016

(65) Prior Publication Data

US 2018/0135795 A1 May 17, 2018

(51) Int. Cl.
*B60D 1/52* (2006.01)
*B60D 1/58* (2006.01)
*F16M 13/02* (2006.01)

(52) U.S. Cl.
CPC ............. *B60D 1/52* (2013.01); *B60D 1/58* (2013.01); *F16M 13/02* (2013.01)

(58) Field of Classification Search
CPC . B62D 63/08; B60D 1/52; B60D 1/58; B60D 1/583
See application file for complete search history.

(56) References Cited

U.S. PATENT DOCUMENTS

| | | | | |
|---|---|---|---|---|
| 3,362,738 A | * | 1/1968 | Dygert | A47B 57/485 108/146 |
| 3,403,928 A | * | 10/1968 | Laughlin | B60D 1/345 280/406.2 |
| 3,664,686 A | * | 5/1972 | Anderson | B60D 1/46 280/490.1 |
| 4,169,611 A | * | 10/1979 | Smith | B60D 1/155 280/482 |
| 4,459,832 A | * | 7/1984 | Avrea | B60D 1/60 280/507 |
| 4,815,638 A | * | 3/1989 | Hutyra | B60R 9/10 224/516 |
| 5,022,534 A | * | 6/1991 | Briggs | A47B 81/005 211/4 |
| 5,219,105 A | * | 6/1993 | Kravitz | B60R 9/06 224/500 |

(Continued)

*Primary Examiner* — Joseph M Rocca
*Assistant Examiner* — Maurice L Williams

(57) ABSTRACT

The present invention relates to a portable storage and locking apparatus that permits towing hitches and hitch-mountable accessories to be stored and locked to trailers, vehicles, buildings and other locations having exposed frames, beams, channels or other structures and storage locations. The apparatus does not require tools or hardware to mount and uses a pair of spaced-apart side plates joined to form a u-shaped mount that slides over a frame. The side plates have at least one pair of square-shaped aligned holes near the open ends, which extend past the frame and are configured to insert a towing hitch or accessory. With the apparatus over a frame, and a towing hitch or accessory inserted in the square holes, the apparatus is effectively secured to the frame and cannot be removed. A trailer hitch locking pin may be used to lock the hitch or accessory to the apparatus, and therefore to the frame.

14 Claims, 10 Drawing Sheets

(56) References Cited

U.S. PATENT DOCUMENTS

| | | | | |
|---|---|---|---|---|
| 5,288,094 A * | 2/1994 | Putnam | ............... | B60D 1/62 248/214 |
| 5,765,850 A * | 6/1998 | Emerson | ............... | B60D 1/46 280/490.1 |
| 5,947,504 A * | 9/1999 | Milazzo | ............... | B60D 1/06 280/457 |
| 7,255,362 B2 * | 8/2007 | Smith | ............... | B60D 1/46 280/462 |
| 7,661,693 B1 * | 2/2010 | Lipski | ............... | B60D 1/06 280/164.1 |
| 7,889,062 B1 * | 2/2011 | Albisa | ............... | B60D 1/52 280/501 |
| 8,186,702 B2 * | 5/2012 | McCoy | ............... | B60D 1/247 280/406.1 |
| 8,628,107 B2 * | 1/2014 | Harper | ............... | B60D 1/06 280/504 |
| 8,833,789 B2 * | 9/2014 | Anderson | ............... | B01D 1/34 280/405.1 |
| 8,893,939 B2 * | 11/2014 | Brass | ............... | B60D 1/60 224/515 |
| 8,960,512 B2 * | 2/2015 | Maenle | ............... | A01B 23/02 224/410 |
| 9,016,707 B2 * | 4/2015 | Bowe | ............... | B60D 1/64 280/420 |
| 9,381,782 B2 * | 7/2016 | Schwennsen | ............... | B60D 1/52 |
| 9,387,739 B2 * | 7/2016 | Babuska | ............... | B60D 1/54 |
| 9,579,940 B2 * | 2/2017 | Mauerman | ............... | B01D 1/34 |
| 2003/0116938 A1 * | 6/2003 | Shields | ............... | B60R 3/007 280/166 |
| 2006/0049612 A1 * | 3/2006 | Anderson | ............... | B60D 1/00 280/405.1 |
| 2008/0073469 A1 * | 3/2008 | Mushan | ............... | H05K 7/1489 248/205.1 |
| 2008/0164678 A1 * | 7/2008 | White | ............... | B60D 1/143 280/504 |
| 2009/0014983 A1 * | 1/2009 | McKendry | ............... | B60D 1/241 280/506 |
| 2010/0207360 A1 * | 8/2010 | Columbia | ............... | B60D 1/02 280/504 |
| 2011/0156369 A1 * | 6/2011 | Schroder | ............... | B60D 1/06 280/491.1 |
| 2012/0049484 A1 * | 3/2012 | Brass | ............... | B60D 1/60 280/507 |
| 2017/0080873 A1 * | 3/2017 | Forhan | ............... | B60D 1/58 |

\* cited by examiner

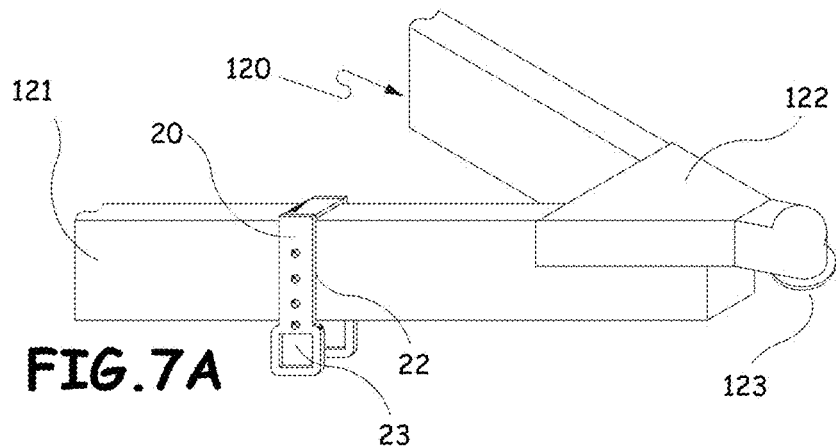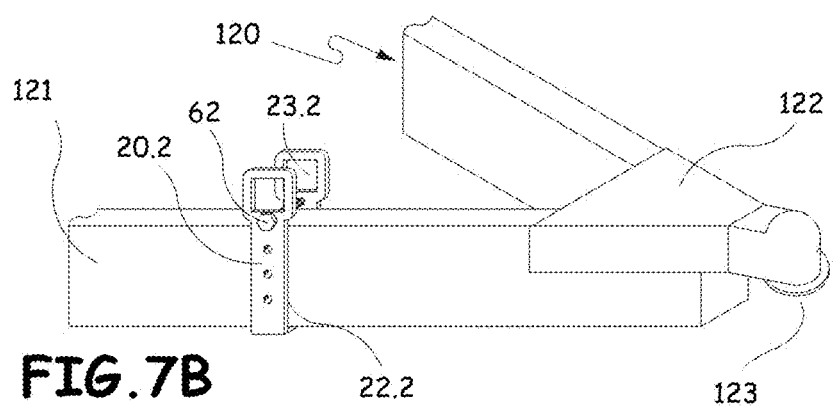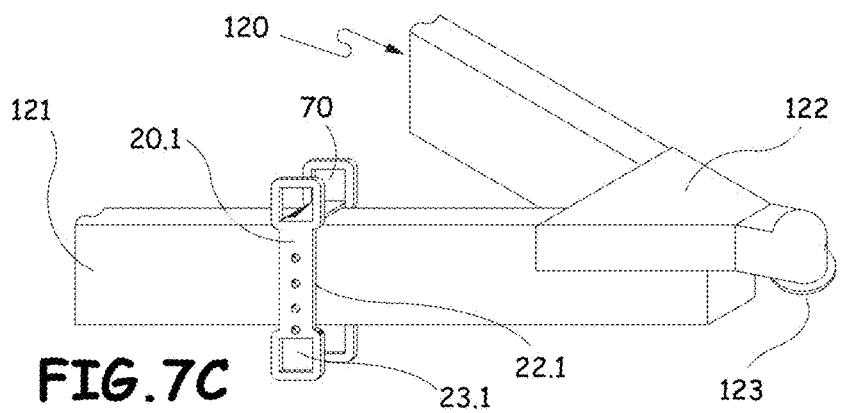

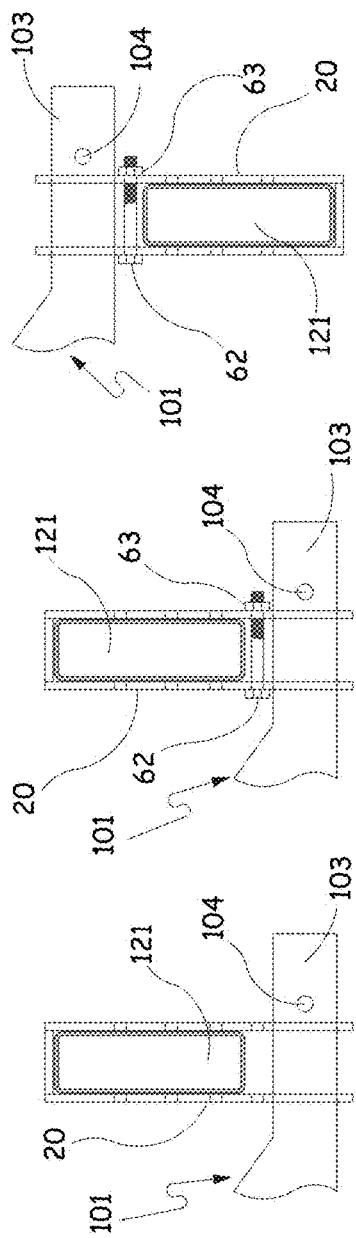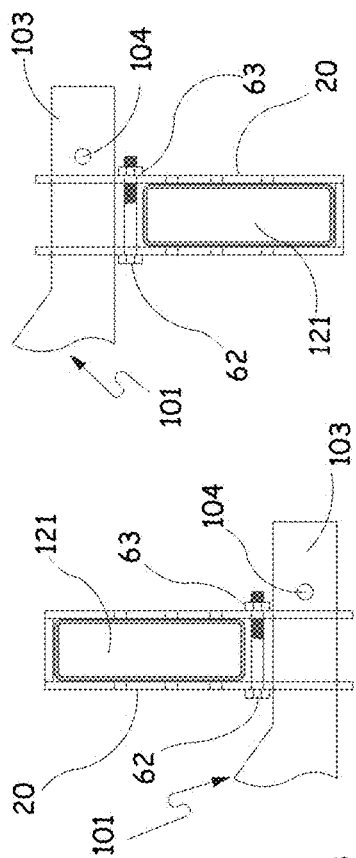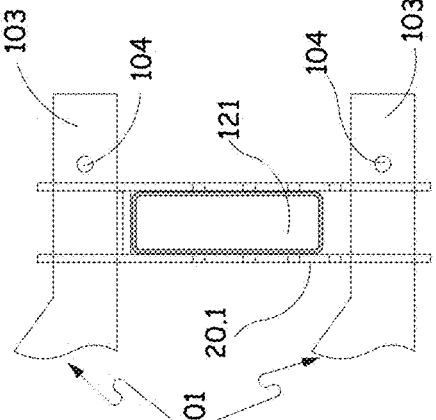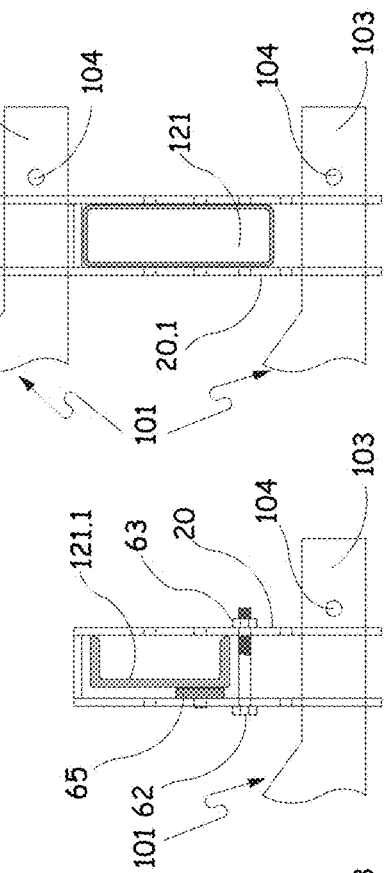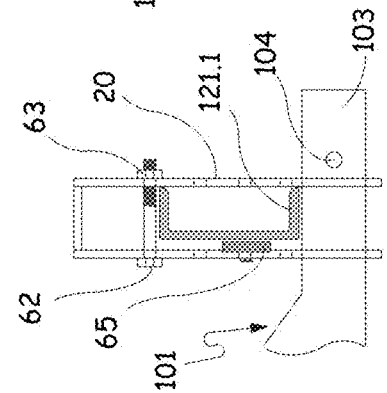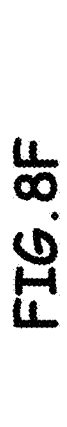

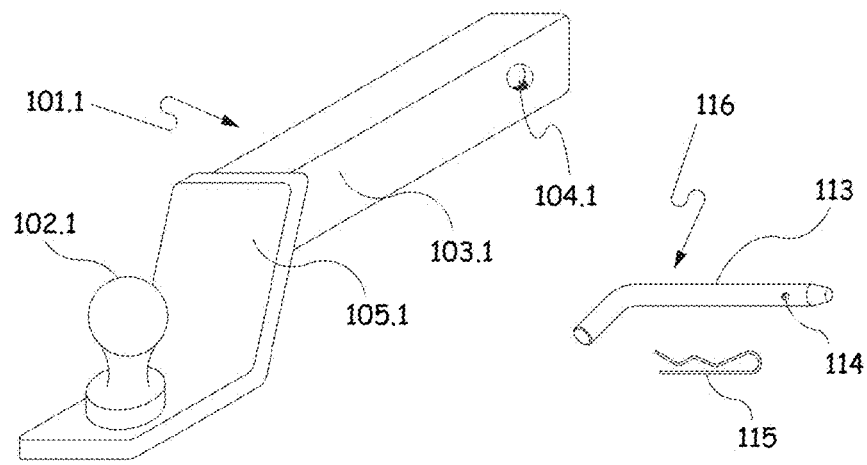
FIG. 9
(Prior Art)
FIG. 10
(Prior Art)
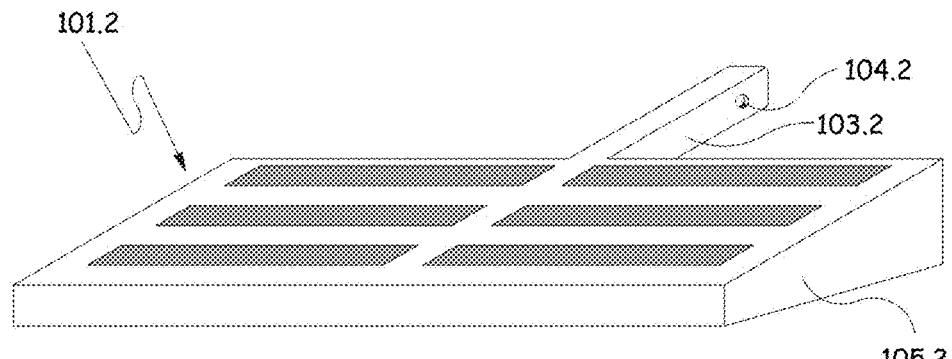
FIG. 11
(Prior Art)

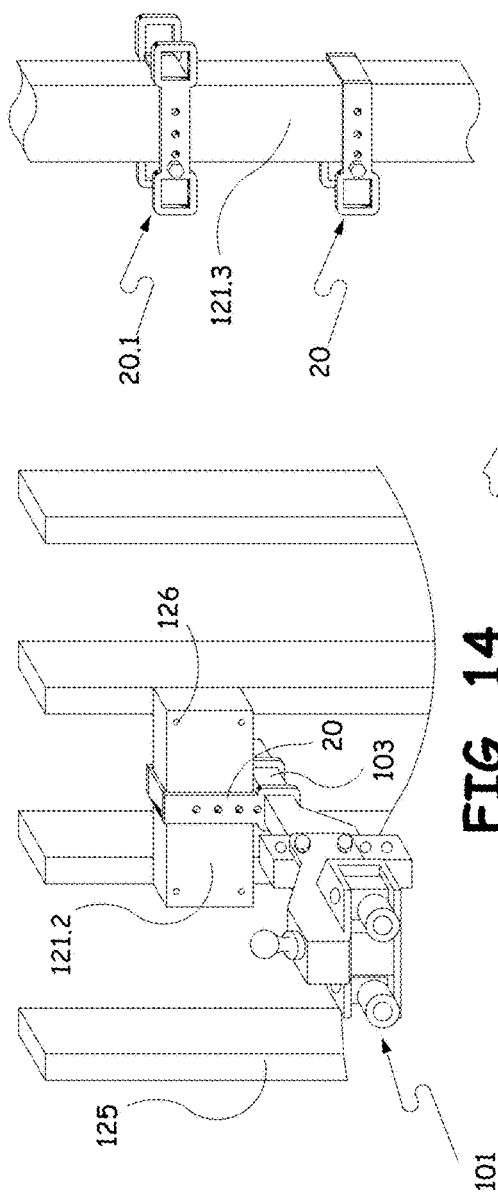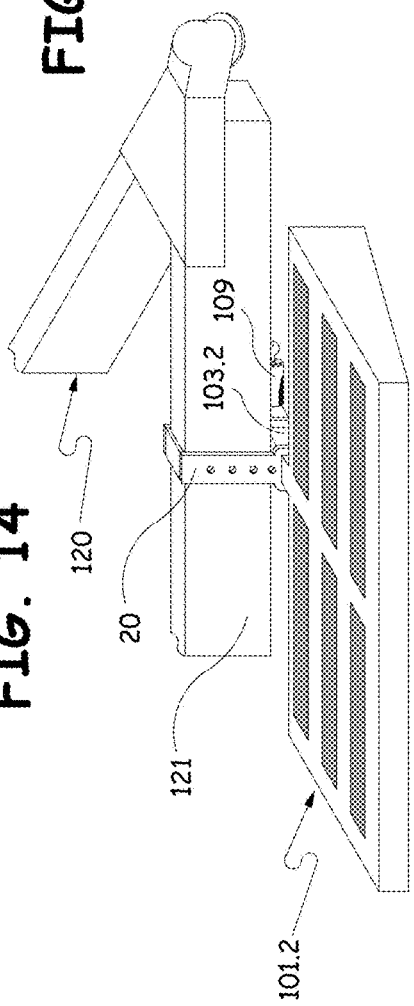

TOWING HITCH AND HITCH-MOUNTABLE ACCESSORY STORAGE AND LOCKING APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention relates to towing hitches and hitch-mountable accessories. In particular, the invention relates to towing hitch and hitch-mountable accessory storage and locking apparatus.

Background Art

It is known to have trailer hitch storage devices for example that mount to vehicles and trailers. Oftentimes these storage devices have a trailer hitch receptacle or receiver which is tubular in shape and exposed to dirt and debris that may accumulate inside the tubular receiver and prematurely wear the towing hitch, the storage device, or make it difficult to insert and remove the towing hitch.

Oftentimes the trailer hitch storage devices are mounted to the trailer or vehicle with bolts and nuts or other fasteners that could loosen and fall off, and may in turn pose an increased safety risk to other vehicles on the road. Additionally, the trailer hitch storage devices that are mounted to the trailer or vehicle with bolts and nuts or other fasteners are oftentimes subject to or at risk of theft and may be readily removed using simple tools, such as wrenches pliers and the like, which effectively by-passes locking devices and pins designed to store, secure and lock the trailer hitch, and the trailer hitch storage device, to the trailer or vehicle.

Still other trailer hitch storage devices may require modifications, such as drilling cutting and the like, be made to the trailer or vehicle to mount the trailer hitch storage device. These trailer and vehicle modifications may in turn contribute to a depreciation of the trailer or vehicle's retail value.

It is further known that trailer hitch storage devices may be installed for example in a basement, or on a wall or structure of a garage or other desired storage locations. However, such trailer hitch storage devices oftentimes require existing walls and structures be modified for installation.

It is further known that trailer hitch storage devices oftentimes require installation tools, such as wrenches screwdrivers and the like, to perform installation of the hitch storage devices rendering them generally permanently installed on the trailer vehicle or garage and inconvenient to move.

It is also known that trailer hitch storage devices oftentimes are not configured to store lock and secure trailer hitch-mountable accessories such as bike racks storage platforms and the like, as is oftentimes desired, such as, for example, when one is out camping boating or the like.

In addition to the problems described above, other problems remain in the art of trailer hitch storage apparatus, some of which are addressed herein.

BRIEF SUMMARY OF THE INVENTION

The present invention provides a towing hitch and hitch-mountable accessory storage and locking apparatus disclosed herein that overcomes the above disadvantages. It is an object of the present invention to provide an improved towing hitch and hitch-mountable accessory storage and locking apparatus.

There is accordingly provided, in combination, a trailer or vehicle or building or other location where it is desirable to store and lock towing hitches or hitch-mountable accessories, and an apparatus for storing and locking towing hitches and hitch-mountable accessories. The trailer or vehicle or building or other location having a frame or beam or channel or other structure as a mounting location. The apparatus includes a mount for connecting to the frame or beam or channel or structure. The mount being generally shaped to receive the frame or beam or channel or structure. The apparatus includes at least one or more towing hitch receptacles configured to receive towing hitches and hitch-mountable accessories.

There is also provided a towing hitch and hitch-mountable accessory storage and locking apparatus for storing towing hitches and hitch-mountable accessories on trailers or vehicles or buildings or other desired storage locations having a frame or beam or channel, or other structure as a mounting location. The apparatus includes a pair of spaced-apart side plates. The side plates have first ends and second ends. The side plates being fixedly connected with a connecting plate disposed between and perpendicular to the side plates. The connecting plate being located between the first ends and the second ends of the side plates. The side plates and the connecting plate together, operatively forming a mount comprising of at least one open end shaped to at least partially extend about and receive the frame or beam or channel or other structure between the side plates and generally abut to the connecting plate, operatively being removably attached to the frame or beam or channel or other structure. The side plates having at least one pair of square-shaped aligned apertures through the faces of the side plates and located generally between the first ends and the second ends of the side plates. Together, each pair of square-shaped aligned apertures operatively forming a towing hitch and hitch-mountable accessory receptacle to receive a towing hitch or hitch-mountable accessory. The side plates may also have a plurality of pairs of aligned apertures configured to receive optional connectors and spacers. The optional connectors being extendable between the side plates for removably connecting the apparatus to the frame or beam or channel or structure. The optional spacers permitting the apparatus to fit various size frames or beams or channels or structures if so desired.

Accordingly, it is therefore another object of the present invention to provide a towing hitch and hitch-mountable accessory storage and locking apparatus for storing towing hitches and hitch-mountable accessories on trailers or vehicles or buildings or other desired storage locations having a frame or beam or channel, or other structure as a mounting location.

It is a third object of the present invention that the apparatus may be removably attached to the frame or beam or channel or other structure without the need for tools or hardware and without modifications or damage to the frame or beam or channel or other structure mounting location. The apparatus thus may be readily moved from one frame or beam or channel or other structure and disposed about another frame or beam or channel or other structure without the need for tools or hardware or modifications or damage to the frame or beam or channel or other structure in a plurality of configurations and orientations. The apparatus, for example, may be readily moved from one trailer frame to another trailer frame, and then to a garage beam, providing the ability to store and lock a towing hitch or hitch-mountable accessory in a plurality of locations using a single portable apparatus.

It is a fourth object of the present invention that the apparatus may include a plurality of towing hitch and hitch-mountable accessory receptacles for storing and locking multiple towing hitches and hitch-mountable accessories in one location on the frame or beam or channel or other structure if desired It is a fifth object of the present invention that the apparatus may optionally be removably connected to the frame or beam or channel or other structure with the use of optional connectors if it is desired to secure the apparatus in a more permanent location on the frame or beam or channel or other structure.

It is a sixth object of the present invention that the apparatus may optionally be fitted to various size frames or beams or channels or other structures with optional spacers if desired.

It is a seventh object of the present invention to provide an apparatus that includes a more secure locking method wherein the apparatus prevents theft by preventing the apparatus from being removed from the frame or beam or channel or other structure using common tools to remove connecting mounting hardware. Thus, one apparatus is disposed about a frame or beam or channel or other structure and a towing hitch or hitch-mountable accessory is disposed in apparatus and secured using a standard trailer hitch pin lock, the towing hitch and hitch-mountable accessory storage apparatus cannot be removed using common tools, for example wrenches and pliers, from the frame or beam or channel or other structure mounting location.

A key feature of novelty in the present invention is that the hitch and hitch-mountable storage and locking apparatus does not have to be installed or fastened or specifically located or otherwise permanently mounted to a frame or beam or channel or other structure while storing and locking towing hitches or hitch-mountable accessories to frames or beams or channels or other structures.

Another key feature of novelty is the added security of preventing theft by not relying on conventional hardware and fasteners as the primary means of connecting and mounting apparatus to the frame or beam or channel or other structure.

Other objects and advantages of the present invention will be readily understood upon reading of the following brief descriptions of the drawing figures, the detailed descriptions of the preferred embodiments, and the appended claims.

BRIEF DESCRIPTION OF THE SEVERAL VIEWS OF THE DRAWINGS

The features of novelty which characterize the present invention are set forth in the appended claims. The features of novelty which characterize the present invention are set forth in the appended claims. The present invention will be more readily understood from the following description of preferred embodiments, by way of example only, with reference to the accompanying drawings, in which:

FIGS. 7A-7B depict fragmentary perspective views of a trailer showing the frame thereof, the trailer being shown partially broken away, with the towing hitch and hitch-mountable accessory storage and locking apparatus shown in FIG. 1 connected thereto, according to a plurality of preferred mounting configurations;

FIG. 7C depict a fragmentary perspective view of a trailer showing the frame thereof, the trailer being shown partially broken away, with the towing hitch and hitch-mountable accessory storage and locking apparatus shown in FIG. 2 connected thereto, according to another preferred mounting configuration;

FIGS. 8A-8E depict cross-sectional views of a trailer frame or channel, a side view of the towing hitch and hitch-mountable accessory storage and locking apparatus shown in FIG. 1 connected thereto, and a fragmentary side view of the towing hitch shown in FIG. 3, the towing hitch partially broken away and connected to the towing hitch and hitch-mountable accessory storage and locking apparatus shown in FIG. 1 according to a plurality of preferred mounting configurations;

FIG. 8F depicts a cross-sectional view of a trailer frame or channel, a side view of the towing hitch and hitch-mountable accessory storage and locking apparatus shown in FIG. 2 connected thereto, and a fragmentary side view of the towing hitch shown in FIG. 3, the towing hitch partially broken away and connected to the towing hitch and hitch-mountable accessory storage and locking apparatus shown in FIG. 2 according to another preferred mounting configuration;

FIG. 9 depicts a perspective view of a second example of a type of towing hitch, specifically in this example a standard ball towing hitch assembly;

FIG. 10 depicts a perspective view of one example of a type of connecting pin and a clip that may alternatively be used in association with the towing hitch and hitch-mountable accessory storage and locking apparatus shown in FIG. 1;

FIG. 11 depicts a perspective view of one example of a hitch-mountable accessory, in this example the hitch-mountable accessory being a step or platform for auxiliary use of towing hitch receivers on vehicles (not shown), and wherein the hitch-mountable accessory can be stored and locked in association with the towing hitch and hitch-mountable accessory storage and locking apparatus shown in FIG. 1 in substantially the same mounting configurations as shown for towing hitches.

FIG. 14 depicts a fragmentary perspective view of a wall showing the support structure of vertical beams thereof, the wall being shown partially broken away, the wall structure showing a horizontal beam attached to at least two of the vertical beams, with the towing hitch and hitch-mountable accessory storage and locking apparatus shown in FIG. 1 connected thereto, and the towing hitch shown in FIG. 3 connected to the towing hitch and hitch-mountable accessory storage and locking apparatus shown in FIG. 1 according to another mounting configuration;

FIG. 15 depicts a fragmentary perspective view of a vertical beam, the beam being shown partially broken away, with the towing hitch and hitch-mountable accessory storage and locking apparatuses shown in FIG. 1 and FIG. 2 connected thereto providing a plurality of towing hitch and hitch-mountable storage and locking locations according to another mounting configuration; and FIG. 16 depicts a fragmentary perspective view of a trailer showing the frame thereof, the trailer being shown partially broken away, with the towing hitch and hitch-mountable accessory storage and locking apparatus shown in FIG. 1 connected thereto, and the hitch-mountable accessory shown in FIG. 11 connected to the towing hitch and hitch-mountable accessory storage and locking apparatus shown in FIG. 1, with the locking pin shown in FIG. 4 connected thereto according to another mounting configuration.

DETAILED DESCRIPTION OF THE INVENTION

Figure 1:
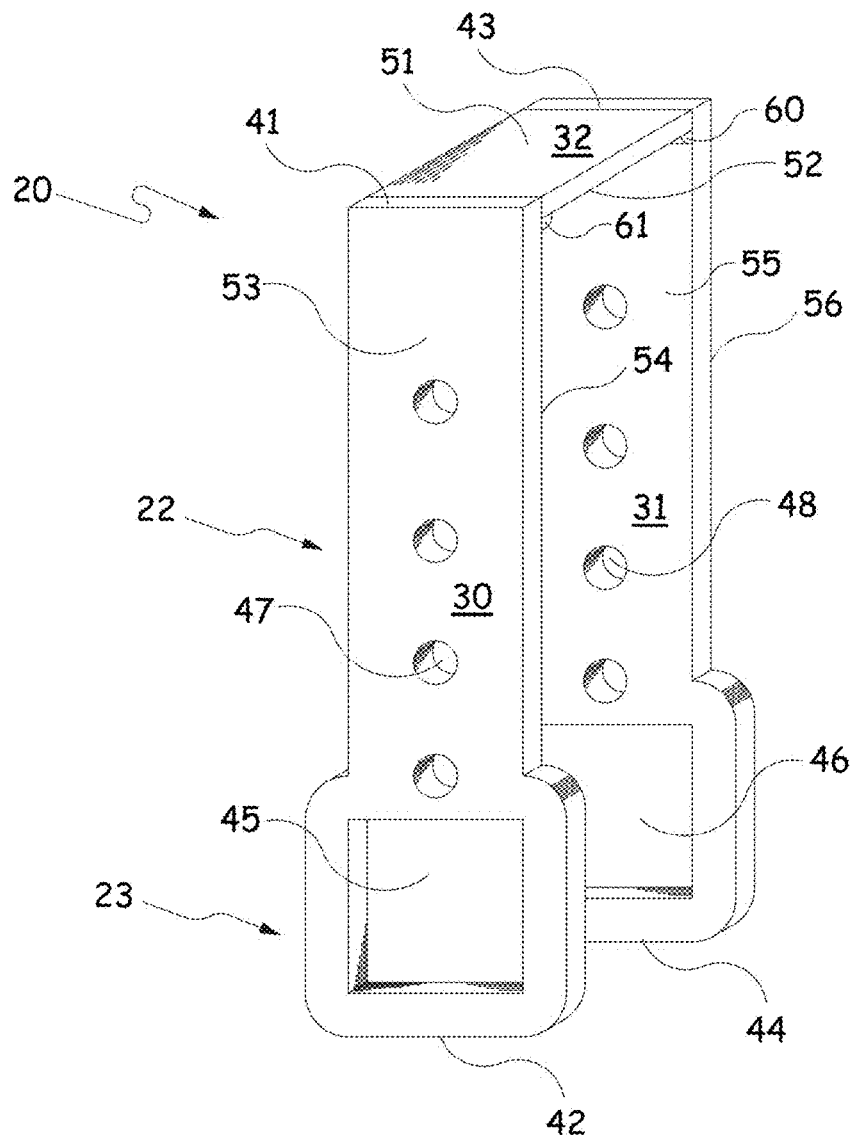
FIG. 1 depicts a perspective view of a towing hitch or hitch-mountable accessory storage and locking apparatus according to one embodiment of the invention.

Referring now to the drawings in detail, reference is first made to FIG. 1, wherein there is provided a towing hitch and hitch-mountable accessory storage and locking apparatus 20. The apparatus is constructed of steel in this embodiment, but other metals or materials may be used.

The towing hitch and hitch-mountable accessory storage and locking apparatus 20 includes a mount 22. Mount 22 includes a pair of spaced apart, parallel side plates 30 and 31. Side plates 30 and 31 have first ends 41 and 43, respectively, which are adjacent to each other. Side plates 30 and 31 also have second ends 42 and 44, respectively, which are adjacent to each other. Second ends 42 and 44 of side plates 30 and 31 are opposite first ends 41 and 43 of side plates 30 and 31, respectively. Side plates 30 and 31 have inside faces 54 and 55, respectively. Side plates 30 and 31 also have outside faces 53 and 56, respectively. Side plates 30 and 31 are substantially rectangular with larger flanged sections, according to this embodiment, near second ends 42 and 44 of side plates 30 and 31, respectively, but may be other shapes in other embodiments. Mount 22 further includes a connecting plate 32. Connecting plate 32 is rectangular according to this embodiment, but may be other shapes in other embodiments. Connecting plate 32 has an inside face 52 and an outside face 51. Connecting plate 32 extends perpendicularly between both side plates 30 and 31 according to this embodiment. Connecting plate 32 is disposed near first ends 41 and 43 of side plates 30 and 31, respectively, according to this embodiment, but may disposed in a plurality of positions between first ends 41 and 43 of side plates 30 and 31 and second ends 42 and 44 of side plates 30 and 31, respectively, in other embodiments. Connecting plate 32 connects to side plates 30 and 31 via weld 61 and 60, respectively, according to this embodiment. Connecting plate 32 is thus integrally connected to side plates 30 and 31. Side plates 30 and 31 are thus operatively connected together via connecting plate 32. Connecting plate 32 is disposed generally perpendicular to both side plates 30 and 31, respectively. Mount 20, having connecting plate 32, and side plates 30 and 31, is thus generally u-shaped according to this embodiment, forming a closed end near the first ends 41 and 43 of side plates 31 and 32, respectively, and an open end opposite the closed end and between second ends 42 and 44 of side plates 30 and 31, respectively, the open end configured to receive a trailer or vehicle frame or other desired frame beam channel or structure.

Side plates 30 and 31 having a plurality of pairs of aligned apertures 47 and 48, respectively, that extend through side plates 30 and 31, respectively. The plurality of pairs of aligned apertures 47 and 48 being disposed generally linearly along the face of side plates 30 and 31, respectively, according to this embodiment, but may be disposed in other locations and quantities in the faces of side plates 30 and 31 in other embodiments.

The towing hitch and hitch-mountable accessory storage and locking apparatus 20 includes a receptacle 23. Receptacle 23 comprising of a pair of opposing aligned square-shaped apertures 45 and 46 through side plates 30 and 31, respectively, in a location near second ends 42 and 44 of side plates 30 and 31, respectively, according to this embodiment, but may be disposed in other locations and quantities in other embodiments.

The aligned pair of apertures 45 and 46 through side plates 30 and 31, respectively, disposed near the open end of mount 20 according to this embodiment, together forming a towing hitch or hitch-mountable accessory receptacle 23. Receptacle 23 being configured to operatively receive a portion of a towing hitch or hitch-mountable accessory (not shown) through both apertures 45 and 46 and thus through both side plates 30 and 31, respectively. The description of a towing hitch or hitch-mountable accessory, for this example, being similar to a load leveling ball towing hitch assembly 101 as shown in FIG. 3.

Figure 2:
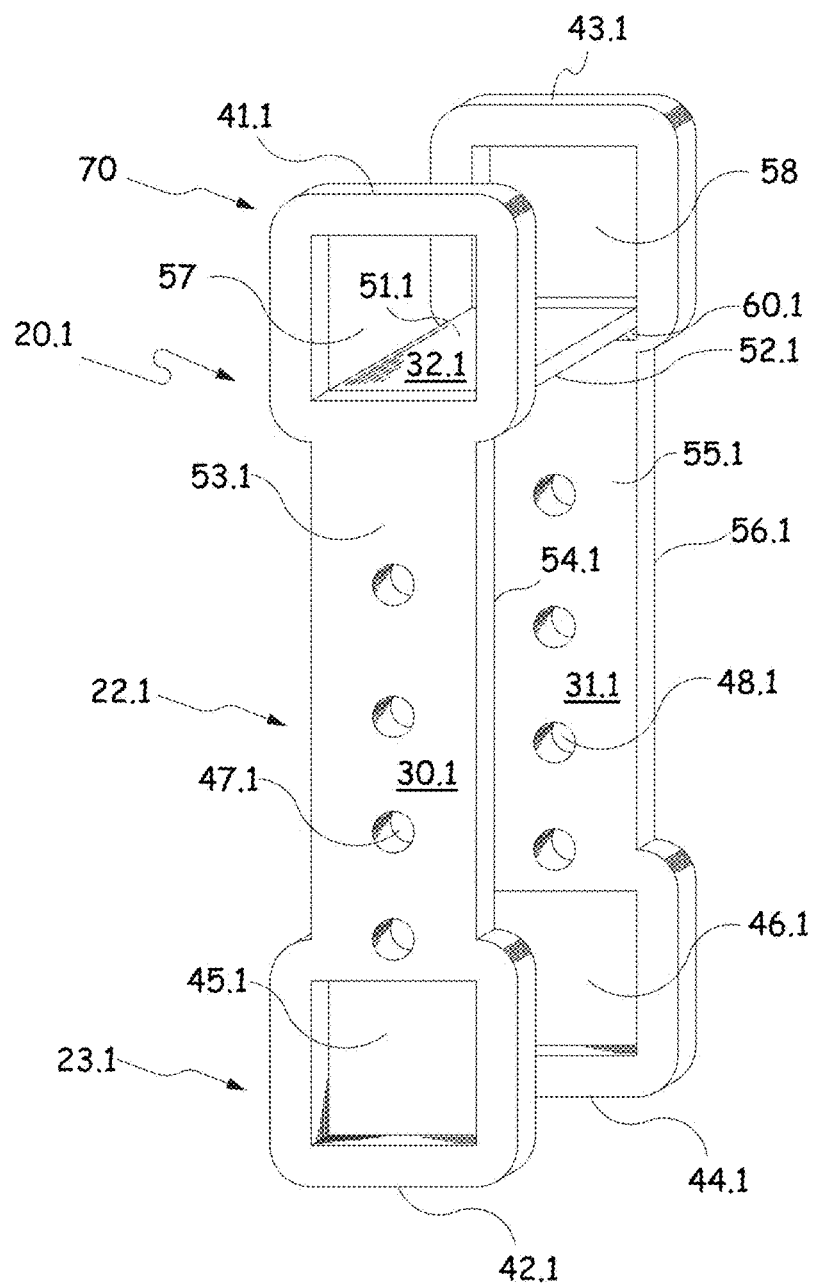
FIG. 2 depicts a perspective view of a towing hitch or hitch-mountable accessory storage and locking apparatus according to a second embodiment of the invention.

Referring to FIG. 2, where there is provided a towing hitch and hitch-mountable accessory storage and locking apparatus 20.1 according to another embodiment. Like parts have like numbers and function as the embodiment of FIG. 1 with the addition of "0.1". Towing hitch and hitch-mountable accessory storage and locking apparatus 20.1 is substantially the same towing hitch and hitch-mountable accessory storage and locking apparatus 20 shown in FIG. 1 with the exception that first ends 41.1 and 43.1 of side plates 30.1 and 31.1, respectively, extend beyond connecting plate 32.1 in a direction away from second ends 42.1 and 44.1, in side plates 30.1 and 31.1, respectively. The extended first ends 41.1 and 43.1 in side plates 30.1 and 31.1, respectively, together forming a second open end in mount 20.1. Mount 20.1, with connecting plate 32.1, and side plates 30.1 and 31.1, is thus generally H-shaped according to this embodiment, forming a first open end between second ends 42.1 and 44.1 of side plates 30.1 and 31.1, respectively, and a second open end between first ends 41.1 and 43.1 of side plates 30.1 and 31.1, respectively. The extended side plates 30.1 and 31.1 include an additional pair of opposing aligned square-shaped apertures 57 and 58 through side plates 30.1 and 31.1 respectively, near first ends 41.1 and 43.1 of side plates 30.1 and 31.1, respectively, according to this embodiment. The second pair of aligned square-shaped apertures 57 and 58 through side plates 30.1 and 31.1, respectively, near the second open end of mount 20.1, together forming a second towing hitch or hitch-mountable accessory receptacle 70. Receptacle 70 being configured to receive a towing hitch or hitch-mountable accessory (not shown) through both apertures 57 and 58 and thus through both side plates 30.1 and 31.1, respectively, according to this embodiment. The description of a towing hitch or hitch-mountable accessory, according to this example, being similar to a standard ball towing hitch assembly 101.1 as shown in FIG. 9. The apparatus 20.1 thus providing the ability to store and lock a plurality of towing hitches or hitch-mountable accessories about and connected to a trailer or vehicle frame (not shown), or other desired frame beam channel or structure (not shown) according to this example.

Figure 3:
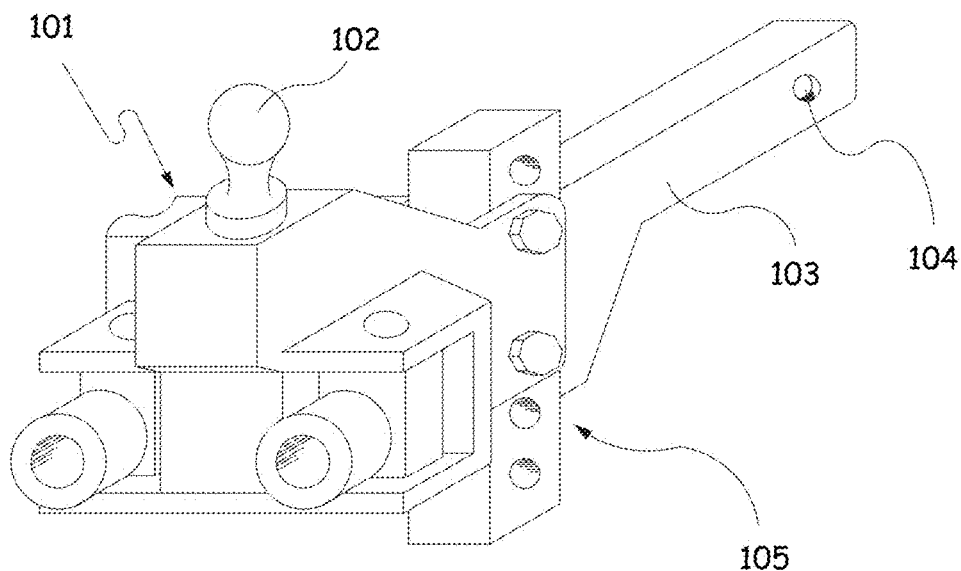
FIG. 3 depicts a perspective view of one example of a type of towing hitch, specifically in this example a load leveling ball towing hitch assembly.
Figure 4:
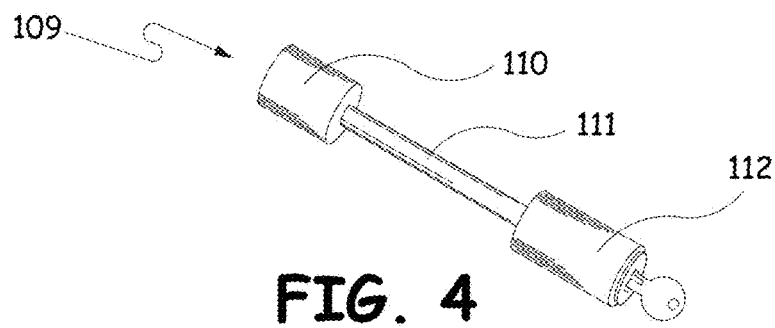
FIG. 4 depicts a perspective view of one example of a type of locking pin that may be used in association with the towing hitch and hitch-mountable accessory storage and locking apparatus shown in FIG. 1.

Referring to FIG. 3, shows an example of a type of load leveling ball towing hitch assembly 101. The load leveling ball towing hitch assembly 101 includes a tow ball 102 mounted to the hitch body assembly 105 for coupling to a trailer. The load leveling ball towing hitch assembly 101 includes a generally elongated tubular-shaped mounting member 103 connected to and extending outward from, the hitch body assembly 105 and configured to be received in a vehicle towing hitch receiver (not shown). The elongated tubular-shaped mounting member 103 includes an aperture 104 extending perpendicular therethrough tubular-shaped mounting member 103 and configured to receive a towing hitch or hitch-mountable accessory locking pin 109 as shown in FIG. 4 or a connector pin 116 as shown in FIG. 10 for connecting a hitch 101, according to this example, to a vehicle towing hitch receiver (not shown). Referring back to FIG. 1, the towing hitch or hitch-mountable accessory receptacle 23, and more specifically the pair of aligned square-shaped apertures 45 and 46 are so shaped as to receive the elongated tubular-shaped mounting member 103 shown in FIG. 3 of the load leveling ball towing hitch assembly 101 therethrough.

Referring to FIG. 4, shows an example of a towing hitch locking pin assembly 109 conventionally and typically used to connect and lock, according to this example, a load leveling ball towing hitch assembly 101 as shown in FIG. 3 to a vehicle towing hitch receiver (not shown). Towing hitch locking pin assembly 109 comprising of a pin 111 with a shoulder 110 and a lock assembly 112 wherein lock assembly 112 removably connects to pin 111, together providing a hitch locking pin assembly 109. Pin 111 configured to be received in aperture 104 located in elongated tubular-shaped mounting member 103 as shown in FIG. 3, according to this example.

Figure 5:
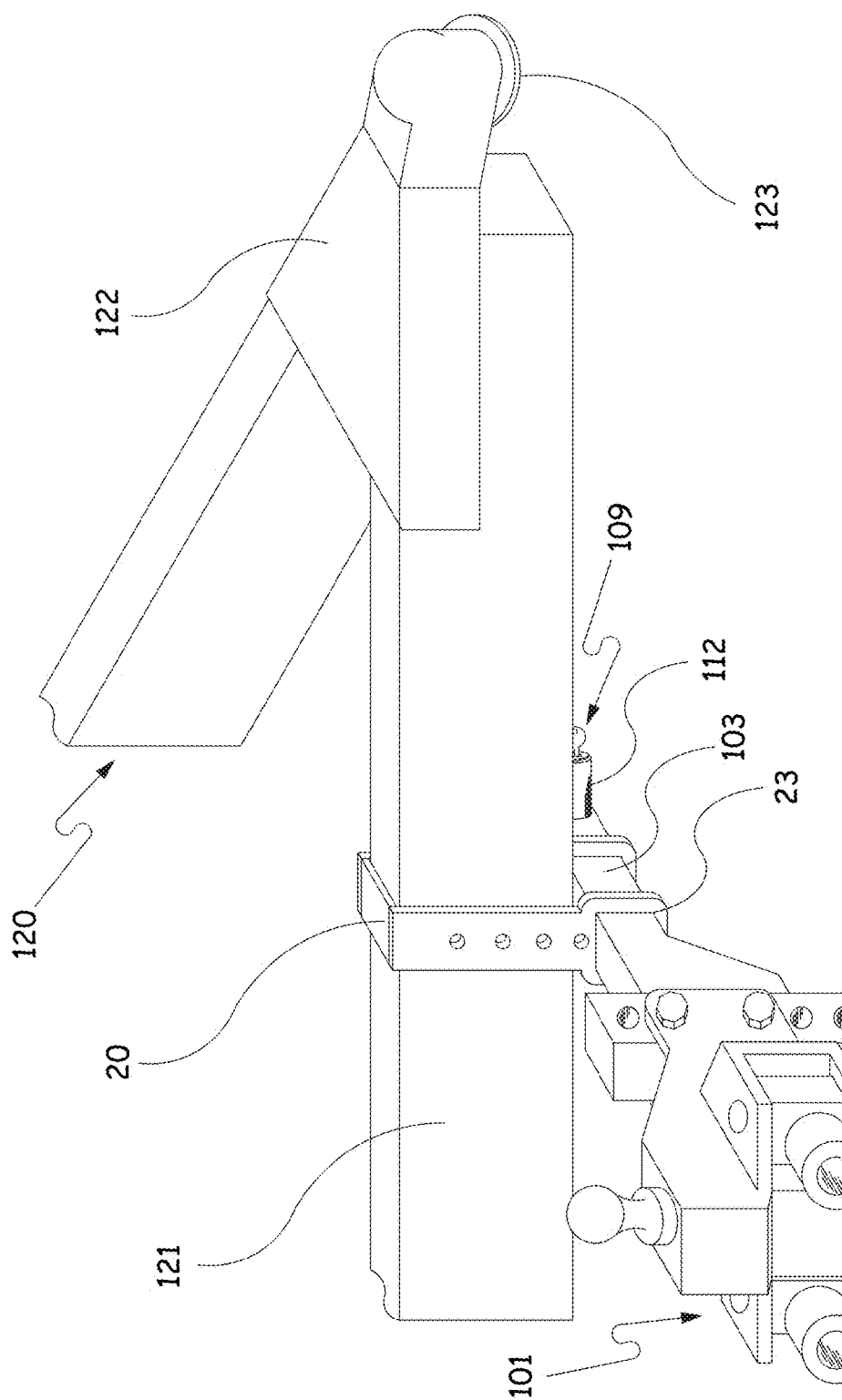
FIG. 5 depicts a fragmentary perspective view of a trailer showing the frame thereof, the trailer being shown partially broken away, with the towing hitch and hitch-mountable accessory storage and locking apparatus shown in FIG. 1 connected thereto, and with the towing hitch shown in FIG. 3 connected to the towing hitch and hitch-mountable accessory storage and locking apparatus shown in FIG. 1, and with the locking pin shown in FIG. 4 connected to the towing hitch as shown in FIG. 3 according to one preferred mounting configuration.

Referring to FIG. 5, a front portion of a trailer 120 according to this example, shows a portion of a trailer frame 121. The trailer frame 121 being connected to a trailer frame neck 122 and a trailer hitch coupler 123. The towing hitch and hitch-mountable accessory storage and locking apparatus 20 is shown disposed about trailer frame 121. This example of a load leveling ball towing hitch assembly 101 is shown having an elongated tubular-shaped mounting member 103 disposed slidably within hitch receptacle 23 of towing hitch and hitch-mountable accessory storage and locking apparatus 20. Together the towing hitch and hitch-mountable accessory storage and locking apparatus 20 being disposed about trailer frame 121, and load leveling ball towing hitch assembly 101 having an elongated tubular-shaped mounting member 103 being received slidably within the hitch receptacle 23 of towing hitch and hitch-mountable accessory storage and locking apparatus 20, operatively and removably attaching towing hitch and hitch-mountable accessory storage and locking apparatus 20 and load leveling ball towing hitch assembly 101 about trailer frame 121. Locking pin assembly 109 being shown installed within and removably connected to elongated tubular-shaped mounting member 103, the elongated tubular-shaped mounting member 103 being disposed slidably within hitch receptacle 23 of towing hitch and hitch-mountable accessory storage and locking apparatus 20, and hitch pin lock assembly 112 being removably connected thereto. Together towing hitch and hitch-mountable accessory storage and locking apparatus 20, load leveling ball towing hitch assembly 101, and hitch lock assembly 112 operably and removeably connected to, and locked to, trailer frame 121 according to this example.

Figure 6:
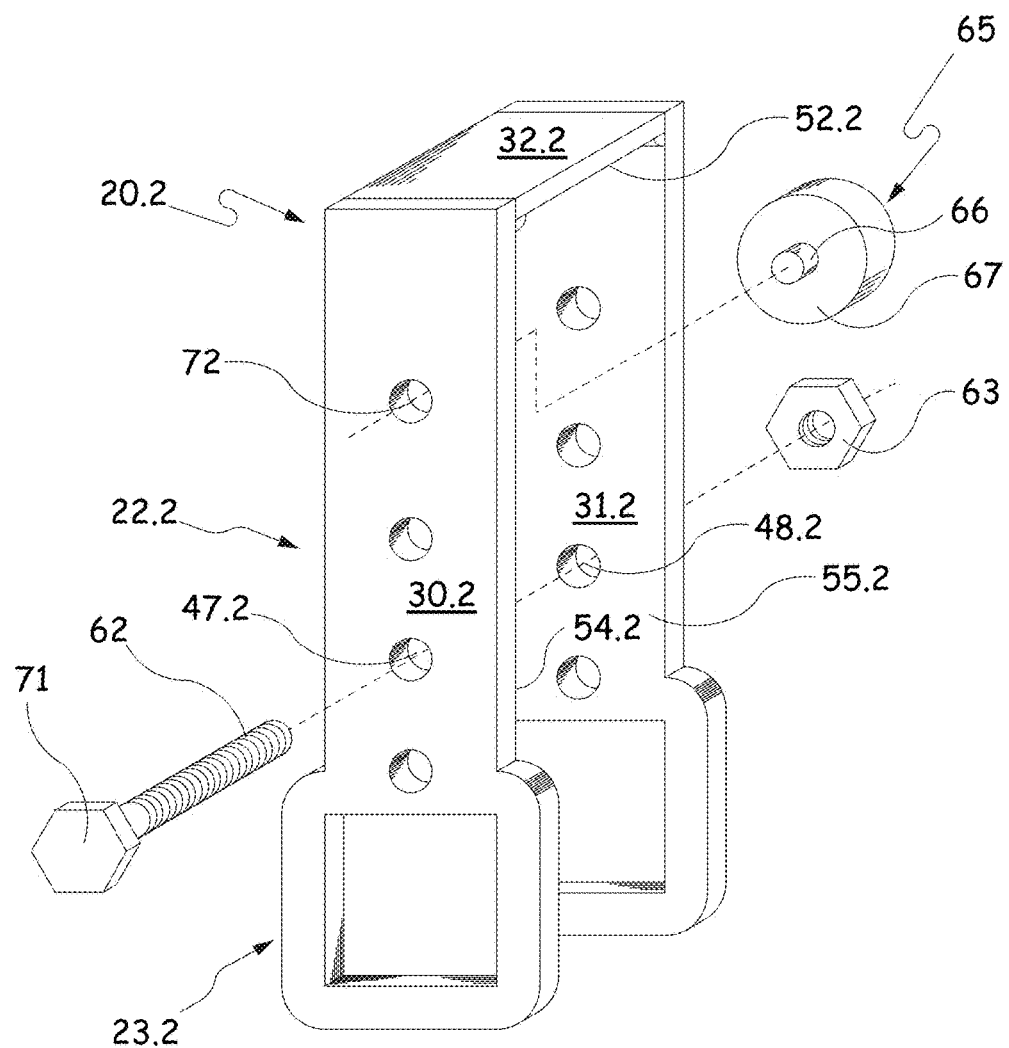
FIG. 6 depicts an exploded perspective view of a towing hitch or hitch-mountable accessory storage and locking apparatus according to a third embodiment, including an optional spacer and connector bolt and nut to removably connect the towing hitch and hitch-mountable accessory storage and locking apparatus to various size frames, beams, channels or other structures according to other embodiments and preferred mounting configurations of the invention.

Referring to FIG. 6, where there is provided a towing hitch and hitch-mountable accessory storage and locking apparatus 20.2 according to another embodiment. Like parts have like numbers and function as the embodiment of FIG. 1 with the addition of "0.2". Towing hitch and hitch-mountable accessory storage and locking apparatus 20.2 is substantially the same towing hitch and hitch-mountable accessory storage and locking apparatus 20 shown in FIG. 1 with the exception of optional connecting bolt 62 and nut 63, and optional spacer 65 according to this embodiment. Side plates 30.2 and 31.2 having a plurality of pairs of aligned apertures 47.2 and 48.2, respectively, that extend through side plates 30.2 and 31.2, respectively. The plurality of pairs of aligned apertures 47.2 and 48.2 being disposed generally linearly along the face of side plates 30.2 and 31.2, respectively, according to this embodiment, but may be disposed in other locations and quantities in the faces of side plates 30.2 and 31.2 in other embodiments.

The optional connecting bolt 62 according to this embodiment being shaped to extend selectively through a plurality or pairs of aligned apertures 47.2 and 48.2 according to this embodiment, thus through the side plates 30.2 and 31.2, respectively. The connecting bolt is thus connectable to and extendable across both side plates 30.2 and 31.2. The connecting bolt 62 also includes a nut 63. The connecting bolt may include other washers or nuts or hardware (not shown) in other embodiments. The connecting bolt 62 according to this embodiment is configured that it may receive threadably nut 63. As nut 63 is tightened in the clockwise direction this causes the head 71 of connecting bolt 62 to abut with side plate 30.2 and nut 63 to abut with side plate 31.2, which in turn causes side plates 30.2 and 31.2 to move closer together relative to each other. The connecting bolt 62 and nut 63, together with side plates 30.2 and 31.2 may thus be said to function in part as a clamp like device.

The optional spacer 65 according to this embodiment has a spacer connector 66 and a spacer body 67. The spacer connector 66 and spacer body 67 are shown generally round according to this embodiment, but may be other shapes in other embodiments. The spacer connector 66 according to this embodiment being shaped smaller than the spacer body 67 and configured to extend selectively through aperture 72 according to this embodiment beginning at the inside face 54.2 of side plate 30.2 and slidably therethrough until the spacer body 67 abuts to the inside face 54.2 of side plate 30.2. The optional spacer 65, and more specifically spacer connector 66 thus operably received and connected to aperture 72 on the inside face 54 of side plate 30.2 according to this embodiment. Mount 20.2 may include a plurality of optional spacers 66 selectively connected to a plurality of apertures 47.2 and 48.2 for example in side plates 30.2 and 31.2 in other embodiments.

Referring to FIGS. 1 and 7A, a front portion of a trailer 120 according to this example, shows a portion of a trailer frame 121. The trailer frame 121 being connected to a trailer frame neck 122 and a trailer hitch coupler 123. The towing hitch and hitch-mountable accessory storage and locking apparatus 20 shown with mount 22 disposed in a downward direction about and removeably attached to trailer frame 121 and hitch receptacle 23 shown ready to receive a towing hitch or hitch-mountable accessory (not shown) according to this example.

Referring to FIGS. 6 and 7B, a front portion of a trailer 120 according to this example, shows a portion of a trailer frame 121. The trailer frame 121 being connected to a trailer frame neck 122 and a trailer hitch coupler 123. The towing hitch and hitch-mountable accessory storage and locking apparatus 20.2 shown with mount 22.2 disposed in an upward direction about and removeably connected to trailer frame 121, with optional bolt 62 disposed selectively through one pair of apertures 47.2 and 48.2, and hitch receptacle 23.2 shown ready to receive a towing hitch or hitch-mountable accessory (not shown) according to this example.

Referring to FIGS. 2 and 7C, a front portion of a trailer 120 according to this example, shows a portion of a trailer frame 121. The trailer frame 121 being connected to a trailer frame neck 122 and a trailer hitch coupler 123. The towing hitch and hitch-mountable accessory storage and locking apparatus 20.1 shown with mount 22.1 disposed in a downward direction about and removably attached to trailer frame 121 and hitch receptacle 23.1 shown ready to receive a plurality of towing hitches or hitch-mountable accessories (not shown) according to this example.

Referring to FIGS. 1, 3 and 8A, illustrates the towing hitch and hitch-mountable accessory storage and locking apparatus 20 according to this example with mount 22 disposed in a downward direction about and removeably attached to the tubular cross section of a frame 121. A portion of a load leveling ball towing hitch assembly 101 and specifically the elongated tubular-shaped mounting member 103 according to this example disposed slidably within hitch receptacle 23 below frame 121 with aperture 104 having passed completely through receptacle 23 according to this example.

Referring to FIGS. 3, 6 and 8B, illustrates the towing hitch and hitch-mountable accessory storage and locking apparatus 20.2 according to this example with mount 22.2 disposed in a downward direction about and removably connected to the tubular cross section of a frame 121. The towing hitch and hitch-mountable accessory storage and locking apparatus 20.2 being removeably connected to frame 121 with optional bolt 62 disposed selectively through one pair of apertures 47.2 and 48.2 below frame 121 and connected threadably to nut 63. A portion of a load leveling ball towing hitch assembly 101 and specifically the elongated tubular-shaped mounting member 103 according to this example being disposed slidably within hitch receptacle 23.2 below frame 121 with aperture 104 having passed completely through receptacle 23.2 according to this example.

Referring to FIGS. 3, 6 and 8C, illustrates the towing hitch and hitch-mountable accessory storage and locking apparatus 20.2 according to this example with mount 22.2 disposed in an upward direction about and removably connected to the tubular cross section of a frame 121. The towing hitch and hitch-mountable accessory storage and locking apparatus 20.2 being removably connected to frame 121 with optional bolt 62 disposed selectively through one pair of apertures 47.2 and 48.2 above frame 121 and connected threadably to nut 63. A portion of a load leveling ball towing hitch assembly 101 and specifically the elongated tubular-shaped mounting member 103 according to this example being disposed slidably within hitch receptacle 23.2 above frame 121 with aperture 104 having passed completely through receptacle 23.2 according to this example.

Referring to FIGS. 3, 6 and 8D, illustrates the towing hitch and hitch-mountable accessory storage and locking apparatus 20.2 according to this example with mount 22.2 disposed in a downward direction about and removably attached to the channel cross section of a frame 121.1. Optional bolt 62 disposed selectively through one pair of apertures 47.2 and 48.2 above channel 121.1 and connected threadably to nut 63. Optional bolt 62 operatively functioning as a vertical spacer to accommodate the smaller vertical height of channel 121.1. An optional spacer 65 being installed to accommodate the smaller width size of channel 121.1. A portion of a load leveling ball towing hitch assembly 101 and specifically the elongated tubular-shaped mounting member 103 according to this example being disposed slidably within hitch receptacle 23.2 below channel 121.1 with aperture 104 having passed completely through receptacle 23.2 according to this example.

Referring to FIGS. 3, 6 and 8E, illustrates the towing hitch and hitch-mountable accessory storage and locking apparatus 20.2 according to this example with mount 22.2 disposed in a downward direction about and removably connected to the channel cross section of a frame 121.1. The towing hitch and hitch-mountable accessory storage and locking apparatus 20.2 being removably connected to a channel 121.1 with optional bolt 62 disposed selectively through one pair of apertures 47.2 and 48.2 below channel 121.1 and connected threadably to nut 63. An optional spacer 65 being installed to accommodate the smaller width size of channel 121.1. A portion of a load leveling ball towing hitch assembly 101 and specifically the elongated tubular-shaped mounting member 103 according to this example being disposed slidably within hitch receptacle 23.2 below channel 121.1 with aperture 104 having passed completely through receptacle 23.2 according to this example.

Referring to FIGS. 2, 3 and 8F, illustrates the towing hitch and hitch-mountable accessory storage and locking apparatus 20.1 according to this example with mount 22.1 disposed in a downward direction about and removably attached to the tubular cross section of a frame 121. A portion of a first load leveling ball towing hitch assembly 101 and specifically the elongated tubular-shaped mounting member 103 according to this example disposed slidably within hitch receptacle 23.1 below frame 121 with aperture 104 having passed completely through receptacle 23, and a portion of a second load leveling ball towing hitch assembly 101 and specifically the elongated tubular-shaped mounting member 103 according to this example disposed slidably within hitch receptacle 70 above frame 121 with aperture 104 having passed completely through receptacle 70 according to this example. Together, towing hitch and hitch-mountable accessory storage and locking apparatus 20.1, and both load leveling ball towing hitch assemblies 101 being removably attached to the tubular cross section of a frame 121.

Referring to FIG. 9, shows an example of a standard ball towing hitch assembly 101.1. The standard ball towing hitch assembly 101.1 includes a tow ball 102.1 mounted to a hitch body 105.1 for coupling to a trailer. The standard ball towing hitch assembly 101.1 includes a generally elongated tubular-shaped mounting member 103.1 connected to, and extending outward from, the hitch body 105.1 and configured to be received in a vehicle towing hitch receiver (not shown). The elongated tubular-shaped mounting member 103.1 includes an aperture 104.1 extending perpendicular therethrough tubular-shaped mounting member 103.1 and configured to receive a towing hitch or hitch-mountable accessory locking pin 109 as shown in FIG. 4 or a connector pin 116 as shown in FIG. 10 for connecting a hitch 101.1, according to this example, to a vehicle towing hitch receiver (not shown). Referring back to FIG. 1, the towing hitch or hitch-mountable accessory receptacle 23, and more specifically the pair of aligned square-shaped apertures 45 and 46 are so shaped as to receive the elongated tubular-shaped mounting member 103.1 of the standard ball towing hitch assembly 101.1 therethrough according to this example.

Referring to FIGS. 3 and 10, shows an example of a towing hitch connecting pin assembly 116 conventionally and typically used to connect, for example, a load leveling ball towing hitch assembly 101 to a vehicle towing hitch receiver (not shown). Towing hitch connecting pin assembly 116 comprising of a pin 113, the pin 113 having an aperture 114 and a clip 115, wherein clip 115 removably connects to pin 113 through aperture 114, together providing a hitch connecting pin assembly 116. Hitch connecting pin assembly 116 configured for example to be received in aperture 104 located in elongated tubular-shaped mounting member 103, according to this example.

Referring to FIGS. 4, 10 and 11, shows an example of a hitch-mountable accessory 101.2. The hitch-mountable accessory 101.2, according to this example, a platform or step which includes a generally elongated tubular-shaped mounting member 103.2 connected to, and extending outward from, the hitch-mountable accessory body 105.2 and configured to be received in a vehicle towing hitch receiver (not shown). The elongated tubular-shaped mounting member 103.2 includes an aperture 104.2 configured to receive a towing hitch or hitch-mountable accessory locking pin 109 or a connector pin 116 for connecting a hitch-mountable accessory 101.2, according to this example, to a vehicle towing hitch receiver (not shown). Referring back to FIG. 1, the towing hitch or hitch-mountable accessory receptacle 23, and more specifically the pair of aligned square-shaped apertures 45 and 46 are so shaped as to receive the elongated tubular-shaped mounting member 103.2 of the hitch-mountable accessory 101.2 therethrough according to this example.

Figure 12:
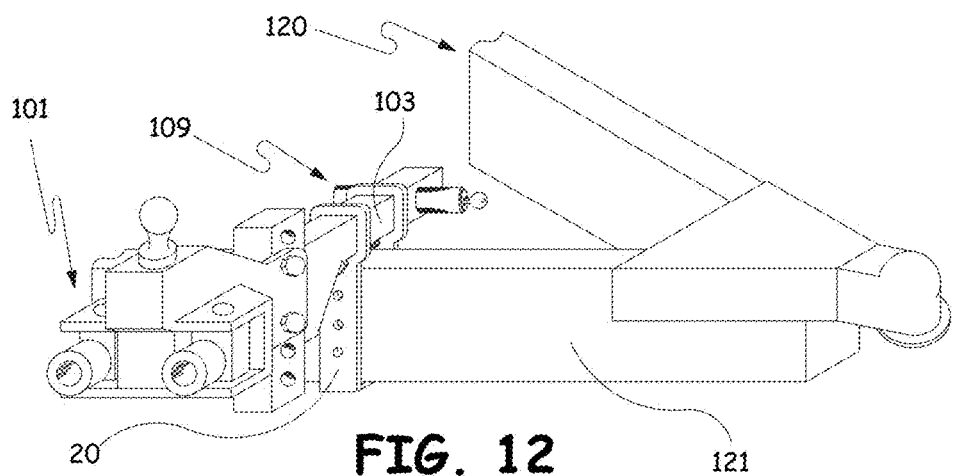
FIG. 12 depicts a fragmentary perspective view of a trailer showing the frame thereof, the trailer being shown partially broken away, with the towing hitch and hitch-mountable accessory storage and locking apparatus shown in FIG. 1 connected thereto in one configuration, and the towing hitch shown in FIG. 3 connected to the towing hitch and hitch-mountable accessory storage and locking apparatus shown in FIG. 1, with the locking pin shown in FIG. 4 connected thereto, thus storing and locking the towing hitch on the trailer frame according to another preferred mounting configuration.

Referring to FIGS. 1 and 12, a front portion of a trailer 120 according to this example, shows a portion of a trailer frame 121. The towing hitch and hitch-mountable accessory storage and locking apparatus 20 is shown disposed in an upward direction about and removably attached to trailer frame 121. This example of a load leveling ball towing hitch assembly 101 is shown having an elongated tubular-shaped mounting member 103 disposed slidably within hitch receptacle 23 of towing hitch and hitch-mountable accessory storage and locking apparatus 20. Together the towing hitch and hitch-mountable accessory storage and locking apparatus 20 being disposed about and removably attached to trailer frame 121, and load leveling ball towing hitch assembly 101 having an elongated tubular-shaped mounting member 103 being received slidably within hitch receptacle 23 of towing hitch and hitch-mountable accessory storage and locking apparatus 20, operatively connecting towing hitch and hitch-mountable accessory storage and locking apparatus 20 and load leveling ball towing hitch assembly 101 about trailer frame 121. Locking pin assembly 109 being shown installed within and removably connected to aperture 104 located along elongated tubular-shaped mounting member 103, the elongated tubular-shaped mounting member 103 disposed slidably within hitch receptacle 23 of towing hitch and hitch-mountable accessory storage and locking apparatus 20, together towing hitch and hitch-mountable accessory storage and locking apparatus 20, load leveling ball towing hitch assembly 101, and hitch lock assembly 109 operably removably connected to, and locked to, trailer frame 121 according to this example.

Figure 13:
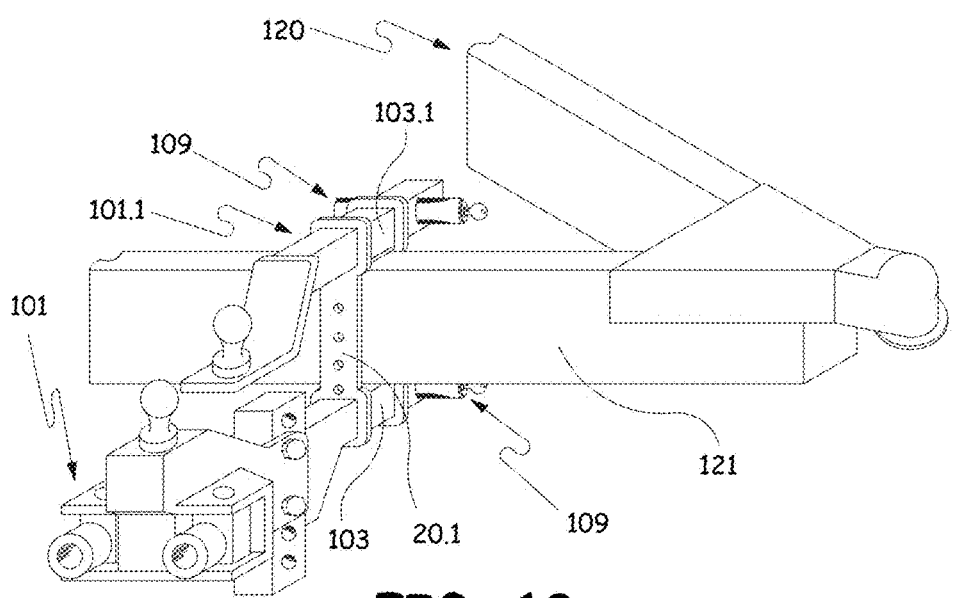
FIG. 13 depicts a fragmentary perspective view of a trailer showing the frame thereof, the trailer being shown partially broken away, with the towing hitch and hitch-mountable accessory storage and locking apparatus shown in FIG. 2 connected thereto in one configuration, and the towing hitch shown in FIG. 3, and the towing hitch shown in FIG. 9, both connected to the towing hitch and hitch-mountable accessory storage and locking apparatus shown in FIG. 2, with a plurality of locking pins shown in FIG. 4 connected thereto, thus storing and locking two towing hitches on the trailer frame according to another mounting configuration.

Referring to FIGS. 2 and 13, a front portion of a trailer 120 according to this example, shows a portion of a trailer frame 121. The towing hitch and hitch-mountable accessory storage and locking apparatus 20.1 is shown disposed in a downward direction about and removably attached to trailer frame 121. According to this example a first towing hitch and a second towing hitch are both removably connected to towing hitch and hitch-mountable accessory storage and locking apparatus 20.1. The first towing hitch being a load leveling ball towing hitch assembly 101 having an elongated tubular-shaped mounting member 103 disposed slidably within hitch receptacle 23.1 of towing hitch and hitch-mountable accessory storage and locking apparatus 20.1. The second towing hitch being a standard ball towing hitch assembly 101.1 having an elongated tubular-shaped mounting member 103.1 disposed slidably within hitch receptacle 70 of towing hitch and hitch-mountable accessory storage and locking apparatus 20.1. Together the towing hitch and hitch-mountable accessory storage and locking apparatus 20.1 being disposed about trailer frame 121, and a load leveling ball towing hitch assembly 101 having an elongated tubular-shaped mounting member 103 being received slidably within the hitch receptacle 23.1 of towing hitch and hitch-mountable accessory storage and locking apparatus 20.1, operatively and removably connecting towing hitch and hitch-mountable accessory storage and locking apparatus 20 and load leveling ball hitch 101 about trailer frame 121. Locking pin assemblies 109 being shown installed within and removably connected to apertures 104 and 104.1 located along elongated tubular-shaped mounting members 103 and 103.1, respectively, the elongated tubular-shaped mounting members 103 and 103.1 being disposed slidably within hitch receptacles 23.1 and 70, respectively, of towing hitch and hitch-mountable accessory storage and locking apparatus 20.1. Together, the towing hitch and hitch-mountable accessory storage and locking apparatus 20.1, and load leveling ball towing hitch assembly 101, and standard ball towing hitch assembly 101.1, and and hitch lock assemblies 109, operably connected to, and locked to, trailer frame 121 according to this example.

Referring to FIGS. 1 and 14, a portion of a wall, for example a garage wall, according to this example, shows a plurality of wall studs 125 and a beam 121.2 fixidly attached to a pair of wall studs 125 with fasteners 126. The towing hitch and hitch-mountable accessory storage and locking apparatus 20 is shown disposed in a downward direction about beam 121.2. This example of a load leveling ball towing hitch assembly 101 is shown having an elongated tubular-shaped mounting member 103 disposed slidably within hitch receptacle 23 of towing hitch and hitch-mountable accessory storage and locking apparatus 20. Together the towing hitch and hitch-mountable accessory storage and locking apparatus 20 being disposed about beam 121.2 and load leveling ball towing hitch assembly 101 having an elongated tubular-shaped mounting member 103 being received slidably within the hitch receptacle 23 of towing hitch and hitch-mountable accessory storage and locking apparatus 20, operatively connecting towing hitch and hitch-mountable accessory storage and locking apparatus 20 and load leveling ball towing hitch assembly 101 about beam 121.2, and thus mounted to said portion of a wall, according to this example of towing hitch storage.

Referring to FIGS. 2, 6 and 15, a portion of a post, for example a vertical beam 121.3, according to this example. The towing hitch and hitch-mountable accessory storage and locking apparatus 20.1 and 20.2 are shown disposed in a horizontal direction about vertical beam 121.3. Optional bolt 62 is disposed selectively through one pair of apertures 47.1 and 48.1 on towing hitch and hitch-mountable accessory storage and locking apparatus 20.1 with hitch receptacle 23.1 and 70 both shown ready to receive a plurality of towing hitches or hitch-mountable accessories (not shown). Optional bolt 62 is also disposed selectively through one pair of apertures 47.2 and 48.2 on towing hitch and hitch-mountable accessory storage and locking apparatus 20.2 with hitch receptacle 23.2 also shown ready to receive a towing hitch or hitch-mountable accessory (not shown). Together the vertical beam 121.3 with towing hitch and hitch-mountable accessory storage and locking apparatus 20.1 and 20.2 forming a plurality of storage locations according to this example.

Referring to FIGS. 1, 11 and 16, a front portion of a trailer 120 according to this example, shows a portion of a trailer frame 121. The towing hitch and hitch-mountable accessory storage and locking apparatus 20 is shown disposed in a downward direction about and removeably attached to trailer frame 121. This example of a hitch-mountable accessory 101.2, specifically an example of a platform or step hitch-mountable accessory, is shown having an elongated tubular-shaped mounting member 103.2 disposed slidably within hitch receptacle 23 of towing hitch and hitch-mountable accessory storage and locking apparatus 20. Together, the towing hitch and hitch-mountable accessory storage and locking apparatus 20 being disposed about and removably attached to trailer frame 121 and hitch-mountable accessory 101.2 having an elongated tubular-shaped mounting member 103 being received slidably within the hitch receptacle 23 of towing hitch and hitch-mountable accessory storage and locking apparatus 20, operatively connecting towing hitch and hitch-mountable accessory storage and locking apparatus 20 and hitch-mountable accessory 101.2 about trailer frame 121. Locking pin assembly 109 being shown installed within and removably connected to aperture 104.2 located along elongated tubular-shaped mounting member 103.2, the elongated tubular-shaped mounting member 103.2 disposed slidably within hitch receptacle 23 of towing hitch and hitch-mountable accessory storage and locking apparatus 20. Together towing hitch and hitch-mountable accessory storage and locking apparatus 20, and hitch-mountable accessory 101.2, and hitch lock assembly 109 operably connected to, and locked to, trailer frame 121 according to this example.

It is to be understood that the invention is not limited to the preferred embodiments described herein, but encompasses all embodiments within the scope of the following claims.

SEQUENCE LISTING

Not Applicable

What is claimed is:

1. An apparatus for storing and locking receiver towing hitches and other hitch-mountable accessories on trailers or vehicles or buildings or other desired storage locations, the trailers or vehicles or buildings or other desired storage locations having an exposed frame member including a portion of a beam or channel or other frame member structure, the apparatus comprising:

a mount for removably attaching the apparatus to the exposed frame member, the mount being substantially U-shaped or H-shaped to receive the exposed frame member at at least one open end of the mount, the mount having a pair of elongated spaced-apart side plates, the side plates being configured to at least partially extend about the exposed frame member and a connecting plate disposed between the side plates, the connecting plate extending perpendicular to and integrally formed with the side plates being located at a desired location along a length of the side plates, the side plates and the connecting plate together forming at least one opening within which the exposed frame member is received, the connecting plate being configured to abut with and at least partially extend over the exposed frame member, the side plates being configured to extend about and beyond the exposed frame member to an open end of the mount in a direction away from and perpendicular to the connecting plate with the exposed frame member so disposed between the side plates and abutted to the connecting plate; and
at least one receptacle to receive a portion of a mounting member of a receiver towing hitch or hitch-mountable accessory, the receptacle being formed by at least one pair of square-shaped apertures in a face of the side plates located along the length of the side plates away from the connecting plate in a direction toward the at least one open end of the mount, the pair of square-shaped apertures facing each other and centrally aligned with each other on a perpendicular axis to the faces of the side plates, the receptacle configured to slidably receive a portion of the receiver towing hitch or hitch mountable accessory through both side plates when the exposed frame member is so disposed between the side plates and abutted to the connecting plate; wherein the pair of square-shaped apertures that form the receptacle being located in the faces of the side plates along the length of the side plates and aligned centrally in the width of the side plates in at least one area of the side plates that extends beyond and away from the exposed frame member when the exposed frame member is so disposed between the side plates and abutted with at least one face of the connecting plate.

2. The apparatus as claimed in claim 1 wherein the pair of spaced-apart side plates have first ends and second ends, the side plates being spaced apart and parallel along the length and width of the side plates, the side plates having inside faces and outside faces, the inside faces facing each other, the connecting plate has a first face and a second face, the connecting plate being integrally formed with the inside faces of the side plates.

3. The apparatus as claimed in claim 2 wherein the side plates have one or more pairs of round apertures therethrough the faces of the side plates, the pairs of round apertures being centrally aligned to each other on an axis perpendicular to the side plates, the pairs of round apertures being located along the length of the side plates and centrally aligned in the width of the side plates between the first face or the second face of the connecting plate and at least one of the receptacles.

4. The apparatus as claimed in claim 3 wherein the mount has one or more connectors configured to selectively connect to and extend between the side plates through one or more pairs of the round apertures, and wherein the connectors comprise a bolt shaped to extend through the apertures and a nut threadably connectable to the bolt.

5. The apparatus as claimed in claim 3 wherein the mount has at least one spacer element configured to selectively connect to at least one of the round apertures on the inside face of at least one side plate, the circumference of the spacer element at at least one point being greater than the circumference of the spacer elements at at least one other point, the circumference of the spacer elements at the at least one other point being configured to be received on the inside face of at least one of the side plates through at least one of the round apertures, the spacer element being operatively coupled to the mount in a fixed position when the exposed frame member is so disposed in the mount.

6. The apparatus as claimed in claim 1 wherein the at least one said pair of the square-shaped apertures are located along the length of the side plates between a first face or second face of the connecting plate and the at least one open end of the mount, the pair of square-shaped apertures being oriented on the faces of the side plates so that two opposite sides of the square-shaped apertures are aligned parallel to the length of the side plates, the mount thus being fully engaged with the exposed frame member wherein the at least one said receptacle is located beyond the exposed frame member in a direction away from the connecting plate and beyond the side of the exposed frame member opposite the side of the exposed frame member abutted to the connecting plate.

7. The apparatus as claimed in claim 6 wherein together the mount, the receptacle, and the receiver-type towing hitch or hitch-mountable accessory are operatively coupled to and disposed about the exposed frame member.

8. The apparatus as claimed in claim 6 wherein the mount may have one or more additional pairs of square-shaped apertures that form additional receptacles located at other desired positions along the length of the side plates and aligned centrally in the width of the side plates; the additional receptacles being further located between the first face or the second face of the connecting plate and the at least one open end of the mount, or between other said receptacles and an open end of the mount, or between the first face or the second face of the connecting plate and other receptacles; the additional pairs of square-shaped apertures sized to receive additional receiver towing hitches or hitch-mountable accessories.

9. The apparatus as claimed in claim 8 wherein a portion of one or more of the conventional receiver towing hitches or hitch-mountable accessories may be received slidably therethrough and removably attached to the additional receptacles in the mount, the plurality of additional said conventional receiver towing hitches or hitch-mountable accessories operatively and simultaneously coupled to the mount.

10. The apparatus as claimed in claim 7 or 9 wherein a portion of the receiver towing hitches or hitch-mountable accessories have an elongated body substantially shaped to be received slidably into the receptacles and coupled to the mount, and have an aperture extending therethrough the elongated bodies perpendicular to a length of the elongated bodies for the purpose of securing or locking said receiver towing hitches or hitch-mountable accessories to the mount by use of pin-lock devices, together the mount, the receiver towing hitches or hitch-mountable accessories and the pin-lock devices are operatively coupled and locked to the exposed frame member.

11. The apparatus as claimed in claim 1 wherein the mount is selectively mountable in a plurality of orientations when disposed about the exposed frame member.

12. In combination, the receiver towing hitch or hitch-mountable accessory and the apparatus for storing and locking towing hitches and other hitch-mountable accessories as claimed in claim 1.

13. In combination, the trailer or vehicle or building or other desired storage location and the apparatus for storing and locking the towing hitches and other hitch-mountable accessories as claimed in claim 1.

14. An apparatus for storing and locking receiver towing hitches and other hitch-mountable accessories on trailers or vehicles or buildings or other desired storage locations, the trailers or vehicles or buildings or other desired storage locations having an exposed frame member including a portion of a beam or channel or other frame member structure, the apparatus comprising:
a pair of elongated spaced-apart side plates having first ends, the side plates having second ends opposite the first ends, the side plates having inside faces and outside faces with the inside faces facing each other, the side plates being spaced apart and parallel along a length and width of the side plates, the side plates being configured to receive and at least partially extend about the exposed frame member;

a connecting plate with a first face and a second face, the connecting plate extending perpendicular to and integrally formed with the side plates, the connecting plate being disposed between the side plates and extending perpendicular to and fixedly connected to the inside faces of the side plates, the connecting plate being located in a desired location between the first ends and second ends of the side plates, the side plates and the connecting plate together forming a mount with at least one open end to receive the exposed frame member, the side plates extending about and beyond the exposed frame member when the exposed frame member is so disposed between the side plates and abutted with at least one face of the connecting plate, the mount thus being fully engaged with the exposed frame member, the mount being selectively mountable based on the shape of the exposed frame member in a plurality of orientations when disposed about and engaged with the exposed frame member;

at least one receptacle configured to receive a portion of the receiver towing hitch or hitch-mountable accessory when the mount is so disposed about the exposed frame member, the receptacle being formed by at least one pair of square-shaped apertures in the faces of the side plates, the pairs of square-shaped apertures facing each other and centrally aligned with each other on a perpendicular axis to the face of the side plates, the pairs of square-shaped apertures being located along the length of the side plates and centrally on the width of the side plates, the pairs of square-shaped apertures further being located along the length of the side plates between the connecting plate and at least one open end of the mount, the pairs of square-shaped apertures being oriented on the faces of the side plates so that two opposite sides of the square-shaped apertures are aligned parallel to the length of the side plates, the pair of square-shaped apertures being sized to receive a portion of a mounting member of the receiver towing hitch or hitch-mountable accessory slidably therethrough, the pair of square-shaped apertures being further located in the faces of the side plates along the length of the side plates in at least one area of the side plates that extends beyond and away from the exposed frame member when the exposed frame member is so disposed between the side plates and abutted with at least one face of the connecting plate, wherein the at least one said receptacle is located beyond the exposed frame member in a direction away from the connecting plate and beyond a side of the exposed frame member opposite the side of the exposed frame member abutted to the connecting plate;

a plurality of pairs of round apertures therethrough the face of the side plates between the first ends and the second ends, the pairs of round apertures being centrally aligned to each other on an axis perpendicular to the side plates, the pairs of round apertures being located centrally on the width of the side plates and between the first face or the second face of the connecting plate and at least one of the receptacles and;

at least one receiver-type towing hitch or hitch-mountable accessory received slidably therethrough and removably attached to at least one of the receptacles, a portion of the receiver towing hitches or hitch-mountable accessory having an elongated body substantially shaped to be received slidably into the receptacles and coupled to the mount, and having an aperture extending therethrough the elongated body perpendicular to the length of the elongated body for the purpose of securing or locking the receiver towing hitch or hitch-mountable accessory to the mount by use of a pin-lock device, together the mount, the receiver towing hitch or hitch-mountable accessories and the pin lock device are operatively coupled and locked to the exposed frame member.

* * * * *